(12) United States Patent
Lospinuso et al.

(10) Patent No.: US 10,956,151 B2
(45) Date of Patent: Mar. 23, 2021

(54) APPARATUS AND METHOD FOR IDENTIFYING CONSTITUENT PARTS OF SOFTWARE BINARIES

(71) Applicant: The Johns Hopkins University, Baltimore, MD (US)

(72) Inventors: Margaret F. Lospinuso, Chapel Hill, NC (US); Sakunthala Harshavardhana, Marlboro, NJ (US); Laura J. Glendenning, Columbia, MD (US); Kathleen N. McGill, Omaha, NE (US); Robert M. Seng, Silver Spring, MD (US); Tzuhsiu Chiou, Silver Spring, MD (US); Sterling E. Vinson, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 16/273,209

(22) Filed: Feb. 12, 2019

(65) Prior Publication Data
US 2019/0250911 A1 Aug. 15, 2019

Related U.S. Application Data

(60) Provisional application No. 62/629,150, filed on Feb. 12, 2018.

(51) Int. Cl.
*G06F 8/74* (2018.01)
*G06F 8/75* (2018.01)

(52) U.S. Cl.
CPC . *G06F 8/74* (2013.01); *G06F 8/75* (2013.01)

(58) Field of Classification Search
CPC ... G06F 8/53; G06F 8/75; G06F 8/751; G06F 8/427
See application file for complete search history.

(56) References Cited

U.S. PATENT DOCUMENTS

| | | | |
|---|---|---|---|
| 7,636,945 B2* | 12/2009 | Chandnani | G06F 21/563 713/188 |
| 9,720,925 B1* | 8/2017 | Lawson | G06F 16/14 |
| 9,996,693 B2* | 6/2018 | Sun | G06F 21/564 |
| 10,318,790 B2* | 6/2019 | Frazier | G06K 9/00087 |
| 10,817,619 B1* | 10/2020 | Kolli | G06F 21/6245 |

(Continued)

*Primary Examiner* — Duy Khuong T Nguyen
(74) *Attorney, Agent, or Firm* — Todd R. Farnsworth

(57) ABSTRACT

An example method for determining a software classification is provided. The example method may include determining a plurality of substream boundaries including a first substream boundary within a representation of a software binary, and segmenting the representation of the software binary into a plurality of substreams. The example method may further include generating a first count string for a first substream based on operational class token counts in a tokenization of the first substream, where the tokenization of the first substream may be based on a mapping of commands within the first substream to operational classes. The example method may further include performing a first count string comparison with a reference database to determine a first count string match, where the first count string comparison being based on the first count string, and classifying the software binary based on the first count string match.

19 Claims, 6 Drawing Sheets

(56) References Cited

U.S. PATENT DOCUMENTS

| | | | | |
|---|---|---|---|---|
| 2010/0281540 A1* | 11/2010 | Alme | .................... | G06F 21/563 |
| | | | | 726/23 |
| 2013/0132932 A1* | 5/2013 | Van Rozen | ........... | G06F 11/362 |
| | | | | 717/124 |
| 2015/0309813 A1* | 10/2015 | Patel | .................. | G06F 11/3664 |
| | | | | 703/22 |
| 2016/0127398 A1* | 5/2016 | Cohen | ............... | G06F 16/24578 |
| | | | | 726/23 |

* cited by examiner $AaBbR_Vr_VW_Vw_VR_Nr_NW_Nw_NJjEe$

Legend
A = Arithmetic Operational Class
B = Boolean Operational Class
$R_V$ = Read Volatile Operational Class
$W_V$ = Write Volatile Operational Class
$R_N$ = Read Non-Volatile Operational Class
$W_N$ = Write Non-Volatile Operational Class
J = Jump Operational Class
E = Exit/Return Operational Class

… (1)

APPARATUS AND METHOD FOR IDENTIFYING CONSTITUENT PARTS OF SOFTWARE BINARIES

CROSS-REFERENCE TO RELATED APPLICATIONS

This application claims the benefit of U.S. Provisional Application No. 62/629,150 filed on Feb. 12, 2018, the entire contents of which are hereby incorporated herein by reference.

TECHNICAL FIELD

Example embodiments generally relate to binary file analysis and, in particular, relate to analysis and classification of binary file segments.

BACKGROUND

As the number of "smart" and interconnected devices increases, the amount of software being executed by these devices also increases. It has become increasingly important to be able to analyze software running on devices to determine attributes about the software. For example, being able to analyze software to determine attribution information about the software may be valuable when attempting to identify the presence of malware or unlicensed software.

BRIEF SUMMARY OF SOME EXAMPLES

According to some example embodiments, an example method for determining a software classification is provided. The example method may comprise determining, via processing circuitry, a plurality of substream boundaries including a first substream boundary within a representation of a software binary, and segmenting, via the processing circuitry, the representation of the software binary, based on the plurality of substream boundaries, into a plurality of substreams including a first substream and a second substream. In this regard, the first substream boundary may separate the first substream from the second substream. The example method may further comprise generating, via the processing circuitry, a first count string for the first substream based on operational class token counts in a tokenization of the first substream. In this regard, the tokenization of the first substream may be based on a mapping of commands within the first substream to operational classes. Additionally, the example method may comprise performing, via the processing circuitry, a first count string comparison with a reference database to determine a first count string match, where the first count string comparison being based on the first count string, and classifying, via the processing circuitry, the software binary based on the first count string match.

An example apparatus configured to determine a software classification is also provided, according to some example embodiments. The apparatus may include processing circuitry configured to receive a software binary, determine a plurality of substream boundaries including a first substream boundary within a representation of the software binary, and segment the representation of the software binary, based on the plurality of substream boundaries, into a plurality of substreams including a first substream and a second substream. In this regard, the first substream boundary may separate the first substream from the second substream. The processing circuitry may be further configured to generate a first count string for the first substream based on operational class token counts of a tokenization of the first substream. The tokenization of the first substream may be based on a mapping of commands within the first substream to operational classes. Further, the processing circuitry may be further configured to perform a first count string comparison with a reference database to determine a first count string match, where the first count string comparison being based on the first count string, and classify the software binary based on the first count string match.

BRIEF DESCRIPTION OF THE SEVERAL VIEWS OF THE DRAWING(S)

Having thus described some embodiments in general terms, reference will now be made to the accompanying drawings, which are not necessarily drawn to scale, and wherein:

DETAILED DESCRIPTION

Figure 1:
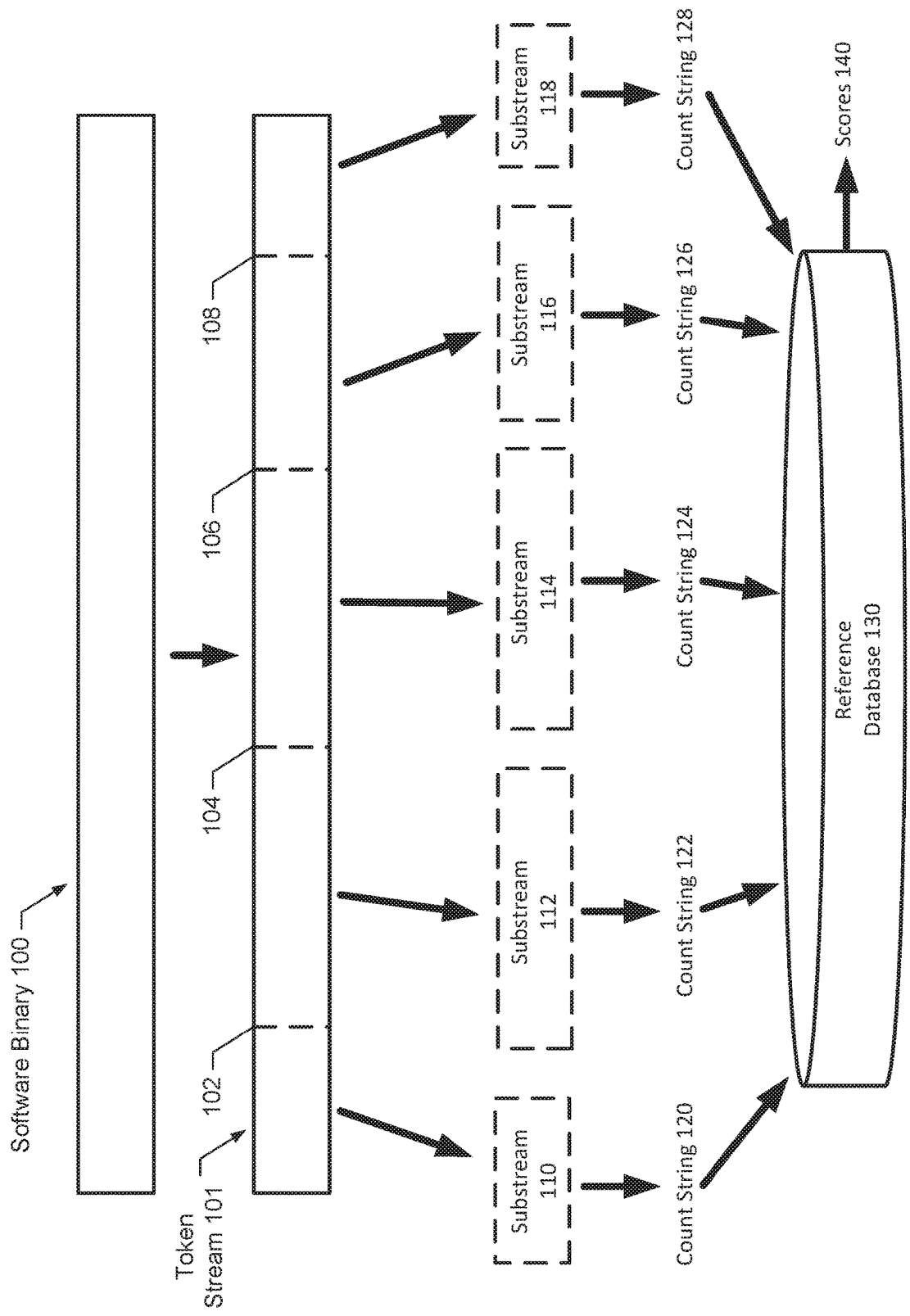
FIG. 1 illustrates an example software binary being segmented into substreams for comparative analysis according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As noted above, being able to analyze software to determine attribution information about the software may be valuable when attempting to identify the presence of malware or unlicensed software. However, when analyzing software, in many instances, only the compiled, executable code may be available, including the presence of executable code in document formats. Such compiled, executable code may be referred to as a software binary. To determine information about the software, these software binaries may be analyzed. Conventional analysis techniques have considered software binaries in their entirety and attempted to determine information about the software binaries via analysis of the binary file as a whole. Analyzing and considering software binaries in their entirety has proven to be effective to some degree. There are, however, instances where software developers and compilers generate binaries that may appear to be quite different when the binary file as a whole is analyzed, but, in fact, are derived from similar sources and components.

As indicated above, a technical problem exists in the current state of the art in that automated software analysis techniques are limited to analyzing compiled, executable software at the software binary level (i.e., the binary file as a whole). A software binary may be a computer readable object (in the form of, for example, code, a file, or the like including characters that are intended to be interpreted as not as merely text characters of a text file but as commands to be executed by a computer. In this regard, for example, a software binary may be compiled, executable code where the characters are indicators of commands to be performed by a processor. In accordance with another example, a software binary may be a document file that includes commands to be executed by the computer that is processing and/or displaying the text, possibly in addition to portions that may be interpreted as text. A software binary may also be the content of a region of computer memory, either in memory, or dumped to a file. In consideration of these software binaries, new benefits can be realized, if analyses could be performed at the sub-binary level to identify similarities at a more granular level. To solve this technical problem and satisfy the need for sub-binary level analysis, various example embodiments described herein operate to determine "boundaries" within software binaries that can be leveraged to segment the software binaries to facilitate sub-binary analysis in high-speed, high-volume processing without the need for reverse engineering. These boundaries can be used to segment the software binary into substreams or molecules. These substreams may be analyzed in isolation, or in the aggregate, to reveal previously unavailable information about the software binary. As such, the automated determination of boundaries within the software binaries or token streams derived from the software binaries can lead to an ability to define and analyze substreams of the software binary and thereby provide a technical solution that is an improvement to computer functionality in the technical area of compiled and executable software analysis. As further explained herein, count strings or signatures, according to some example embodiments, may be generated based on a substream, and the count strings can be used to further increase the speed of automated software analysis by providing a simplified representation that can be readily compared with previously defined reference count strings or signatures. As a result of the comparisons, matches may be identified for scoring that can be used to classify the software binaries. Such classification of software binaries may be useful for a variety of applications, such as, identifying malware and malware attribution, supply chain risk management for commercial off-the-shelf (COTS) products that run software, licensed or unlicensed software management and due diligence including considerations for free or open source software (FOSS), performing software vulnerability analyses, performing Internet of Things (IoT) firmware load reviews, performing due diligence for other legal and safety issues, and the like.

As such, according to some example embodiments, systems, apparatuses, and methods are provided herein that can operate to segment software binaries into constituent parts in the form of substreams for further analysis to classify the software binary. In this regard, software binaries, which include malware binaries, may be created from a collection of constituent parts or substreams, such as statically compiled libraries and code sub-routines. Such substreams may often be re-used across many software binaries and therefore each instance of a substream may not be unique. Due to this re-use, patterns in the use of the substream may be identified, which may provide further information about the software binary being analyzed, possibly relative to other software binaries that are under analysis or have been previously analyzed. For example, substreams have been used to identify the presence of specific subroutines from versions of the Microsoft Runtime Library msvcr*.dll in malware binaries, and to identify specific differences between versions of this standard library. In this regard, elements of Microsoft Runtime Library may be included in many binaries, often because the Microsoft Runtime Library may handle comparing the content of memory, comparing strings, time inquiries and the like. Some example embodiments provide the ability to detect elements from older versions of the library in software and associated software binaries that have been presented as being updated, when in fact the updated versions are not being used. According to some example embodiments, this type of version detection may be performed by analyzing the substreams of the software binaries, and sub analyses may be performed completely automatically at high speed.

Further, substreams of software binaries may also have characteristics that may assist in determining attribution for the software binaries under analysis. Determining attribution may be useful in classifying software binaries as malware or to identify potential licensing issues. In this regard, attribution information may include, for example, source entities or organizations that are the source of the software binaries, countries of origin for the software binaries, or the like. Additionally, a characteristic of a substream may indicate the types of vulnerabilities that the substream introduces to the software binary. As such, certain substreams may be associated with certain identified vulnerabilities. Accordingly, the analysis of substreams can offer an improved ability to identify potential security and legal risks associated with the software binary that is being analyzed. Such analysis may be particularly useful in, for example, the context of embedded systems within special purpose devices where compiled code and applications are available for analysis, but source code and information about the compilation process are not readily available.

According to some example embodiments, a new method is provided that can identify substreams of software binaries, for example, in millions of samples, automatically, and report relationships to other binaries based on analyses of the substreams. As further described herein, software binaries, according to some example embodiments, can be converted into a token stream based on a mapping of commands within the software binaries to defined operational classes. Each command within a software binary may be mapped to a respective operational class token to form a token string for the software binary. Examples of operational classes include, but are not limited to, arithmetic operations, Boolean operations, read volatile register operations, write volatile register operations, read non-volatile register operations, write non-volatile register operations, jump operations, exit/return operations, and the like. Boundaries within the token string may then be determined to fragment the token stream into substreams (or molecules). According to some example embodiments, the determination of boundaries within the token stream of a software binary, or within the software binary itself, may be performed without a priori information about the function or organization of the software binary. The substreams may be determined using, according to some example embodiments, a rules-based approach for determining the locations of the substream boundaries.

According to some example embodiments some or all of the substreams may be converted into respective count strings, which may be a simplified representation or signature of a respective substream. In this regard, according to some example embodiments, the count strings may be formed by collating the number of tokens from each operational class in the sub stream into, for example, a common, fixed length string. For example, a count string may be a sequence of operational class indicators, each followed by a count of the tokens within the substream for that respective operational class. In this regard, an example count string may be $A2B1R_V2W_V3R_N0W_N0J0E1$, where A, B, $R_V$, $W_V$, $R_N$, $W_N$, J, and E are example operational class indicators as further described below. As such, according to some example embodiments, a count string may indicate how many tokens in each operational class are present in the sub stream.

According to some example embodiments, the generated count strings may then be compared to reference count strings in a reference database, and count string scores may be determined with respect to the reference count strings. According to various example embodiments, scoring may be determined in a number of ways. For example, the count string scores may be an indication of the degree of similarity between a count string and a reference count string. Based on the count string score, degrees of similarity or exact matches may be identified, which may indicate, for example, related versions of substreams of software binaries. Alternatively or additionally, according to some example embodiments, scoring may be performed on the basis of normalized count strings, select operational class token counts, or other methods of weighing the contribution of select operational class token counts. Further, according to some example embodiments, count string significance criteria may be evaluated to prioritize or disregard certain strings for comparison and scoring on a case-by-case basis. As such, for example, common substreams having common count strings may be excluded. On the contrary, substreams that have been tagged as interesting and have a high significance may be prioritized higher or simply not excluded. In this regard, significance tagging, according to some example embodiments, may be performed via, for example, an automated rule-based propagation of information relating to the content of the substreams based on prior results of manual reverse engineering.

Further, according to some example embodiments, the generation and scoring of count strings may be independent of the position of the associated substreams in the software binaries, but may be deterministic in identifying substream boundaries, even in binaries with different functionalities. As such, the same or similar small segments of code in the form of substreams can be identified no matter where the substreams are embedded in the software binary due to having a determined beginning and ending. In this regard, for example, example embodiments where the operational classes are used to define boundaries may identify code sequences that can be kept intact even when obfuscation techniques are applied. As such, according to some example embodiments, an approach is provided that is not affected by the re-ordering of executable code, and may be able to provide granular identification of common code in software binaries with different overall functionalities. Further, according to some example embodiments, high-speed, fully automated processing of large numbers of software binaries may be performed at the sub-binary level in a manner that supports scalability for increased volume requirements.

In view of the foregoing, FIG. 1 illustrates an example software binary being segmented into substreams for comparative analysis according to some example embodiments. In this regard, according to some example embodiments, a software binary 100 may be received for processing. The software binary 100 may comprise, in some example embodiments, compiled, executable code that can be executed by a processor to perform a desired series of commands. In this regard, the software binary 100 may be comprised of a number of commands that if executed may be stored in a memory and loaded into a processor to instruct the processor to perform certain operations. According to some example embodiments, the software binary 100 may be a portion of larger software program or may embody an entire software program.

According to some example embodiments, a representation of the software binary 100 may be generated, for example, in the form of a token stream 101 formed based on the entire software binary. In this regard, the token stream 101 may be formed by mapping commands of the software binary 100 to operational classes defined for the commands. According to some example embodiments, mapping the commands may be performed sequentially (e.g., from beginning to end). For example, a command within the software binary 100 that causes a focus of operation to move to another location within the software binary 100 (or jump to another location within the software binary 100) may be mapped to a jump operational class and a jump operational class token may be mapped to the command in the token stream 101. In this regard, a similar mapping process may be undertaken for each command in the software binary 100 to generate the representation of the software binary 100 in the form of the token stream 101. As further described below, according to some example embodiments, tokenization may alternatively be applied to the substreams after the substream boundaries and segmentation occurs.

According to some example embodiments, the representation of the software binary in the form of the token stream 101 may be a portion of a tokenized memory dump from a computer memory device. In this regard, according to some example embodiments, the software binary for analysis may be received (or intercepted) as part of a communication, or the software binary may be received as an operation of an analysis of data already stored on a memory device. In this regard, for example, malware in the form of, for example, ransomware, is often communicated in a heavily obfuscated form and then later unpacks only in memory. As such, an analysis, according to some example embodiments, may be performed on the unpacked and stored software binaries. Further, according to some example embodiments, the contents of a memory device may be repeatedly analyzed to identify malware since, in some instances, malware may attempt to only reside within the memory (e.g., random access memory or on-chip memory) and avoid writing out to a file. Once malware is established in memory, the malware may be difficult to locate via conventional techniques. However, a vigilant memory watch dog, such as one that resides in the hypervisor or virtual memory monitor (VMM) of a virtual machine, may be an effective context to monitor memory for target substreams. Also, such monitoring may be implemented when, for example, processing power is free to perform the monitoring without detrimentally impacting performance of other processing tasks and user experience.

The operational classes that are defined for tokenization mapping may be based on the type of software binaries that are being analyzed. In this regard, according to some example embodiments, the operational classes may be associated with an x86 or similar environment where the operational classes may include, but not be limited to, for example, an arithmetic class, a Boolean class, a read volatile register class, a write volatile register class, a read non-volatile register class, a write non-volatile register class, a jump class, an exit class, or the like. As such, when a software binary or substream is being tokenized, each command may be evaluated to determine which operational class the command belongs to. For example, a substream may include a jump_address command (jump to a specific address) and a jump relative command (jump to a relative address, such as, for example, jump 10 bytes forward). Each of these jump commands may belong to the jump operational class having a token that is "J". As such, when tokenizing this example substream, the jump_address command may be mapped to a "J" in the tokenized substream and the jump_relative command may also be mapped to "J". According to some example embodiments, operational classes may be defined with respect to other environments or specific implementations such as, for example, PDF, Mono/.Net, JavaScript, Java, document or spreadsheet formats, or the like.

According to some example embodiments, the token stream 101 may be analyzed to determine substream boundaries within the token stream 101. By defining substream boundaries, according to some example embodiments, fast, deterministic identification of substreams is made available. Further, the substream boundaries provide for an ability to delineate the same code in different software binaries in an efficient manner, without having to perform, according to some example embodiments, a combinatorically complex process of computing all possible substreams. The substream boundaries may define separation or segmentation points between portions of the token stream 101. In this regard, according to some example embodiments, boundary rules may be applied to the token stream 101 to determine the locations of the boundaries. Accordingly, based on the substream boundary rules, example substream boundaries 102, 104, 106, and 108 may be defined. For explanation purposes, four example substream boundaries have been defined here, however, it is understood that any number of substream boundaries may be defined based on the particular substream boundary rules and the content of the token stream 101. According to some example embodiments, the tokenization mapping may begin at the end of the software binary or substream and the tokenization mapping may be performed on the commands moving toward a beginning of the software. Moving from the end of the software binary or towards the beginning may, according to some example embodiments, introduce an efficiency since many high value commands are often located at or near the end of the software binary or substream. In this regard, many compilers may have a tendency to include a higher density of closing commands (e.g., non-volatile register write commands, exit commands, or the like) towards the end of a software binary and therefore end portion of the software binary has a higher likelihood of including higher value commands for determining substream boundaries. In this regard, according to some example embodiments, application of the substream boundary rules, as provided herein, may be implemented as tokenization of the software binary or the substream is performed. In other words, according to some example embodiments, application of the substream boundary rules may be performed at the same time as tokenization and before tokenization of the entire software binary or substream is complete.

According to some example embodiments, an example boundary rule may be to identify tokens that involve actions upon a non-volatile registers. In this regard, non-volatile register actions, such as a write operation of a non-volatile register preceded by a read operation of the non-volatile register may be indicative of placement for a substream boundary after the write operation or before the read operation.

According to some example embodiments, another substream boundary rule may operate to place a substream boundary after an exit (or return) token. In this regard, the exit token may indicate that an important series of operations has been completed and therefore the software binary 100 may be exited. As such, a boundary rule may be defined, according to some example embodiments, that places a substream boundary after an exit token.

Additionally, for example, a maximum length boundary rule may be defined. The maximum length boundary rule may indicate that a substream boundary may be set if the number of tokens since a previous boundary was defined exceeds a maximum number. According to some example embodiments, the maximum number may be 144 tokens. In application, for example, analysis of the token stream 101 may move from the end of the token stream 101 to the beginning of the token stream 101. After having defined a previous substream boundary (which may be the end of the token stream 101 since analysis may move from the end to the beginning of the token stream 101), a counter may be incremented as the analysis moves through each token. If the maximum number of tokens is reached before a new substream boundary is set by another rule, then a new substream boundary may be set after the next token. As such, this rule may set a maximum token length between substream boundaries.

As such, a collection of rules, such as those defined above, may be defined and utilized to determine substream boundaries. Other example substream boundary rules may be defined based on, for example, an exact sequence of tokens being identified, a maximum number of tokens in a selected operational class being reached, the occurrence of a token in a first operational class being a defined distance (e.g., greater than or less than) away from a token in another operational class, or the like. Based on these and possibly other substream boundary rules, a plurality of substream boundaries may be defined in the token stream 101. Further, according to some example embodiments, rules may be defined based on industry standards that may be used to define the architecture and content of the software binaries. For example, Application Binary Interface (ABI) used by both Microsoft and Linux for x86 binaries may be a basis for defining boundary rules. Additionally, other standards in the context of mobile or smart phone apps and applications may be utilized to develop boundary rules.

Having determined the substream boundaries 102, 104, 106, and 108, the substreams may be determined by segmenting the token stream 101 at the substream boundaries 102, 104, 106, and 108. In this regard, referring again to FIG. 1, substreams 110, 112, 114, 116, and 118 may be defined. The substreams 110, 112, 114, 116, and 118, according to some example embodiments, may be unaltered portions of the token steam 101 that have been separated from each other for analysis. Since, according to some example embodiments, the organization of the substreams 110, 112, 114, 116, and 118 within the token stream 101 is not considered in the analysis, no information about the ordering or the relationship to other substreams is required to be maintained. In this regard, according to some example embodiments, the substreams 110, 112, 114, 116, and 118 may be individually and independently analyzed.

Subsequently, a count string for each substream may be formed. More specifically, count string 120 may be formed based on the tokens of substream 110. Count string 122 may be formed based on the tokens of substream 112. Count string 124 may be formed based on the tokens of substream 114. Count string 126 may be formed based on the tokens of substream 116. Finally, in the example of FIG. 1, count string 128 may be formed based on the tokens of substream 118.

Each count string may be formed as a simplified representation of the respective substream, which may be referred to as a signature of the substream. According to some example embodiments, to form a count string from a substream, the substream may be first tokenized. Tokenization may occur, as described above, at the software binary level prior to substream boundary determination, or, as further described below, tokenization may be performed after the substream boundaries are determined. As such, the count string may be generated based on a tokenized substream. According to some example embodiments, the count strings may be formed by collating the number of tokens from each operational class in the substream to form operational class token counts. As such, each operational class may have an associated count and the count string may be formed as string comprising each operational class token count. According to some example embodiments, the operational class token counts may be represented by an identifier (e.g., a single character) that indicates which operational class the count is associated with. Alternatively, a position of the count within in the string may be used to indicate which operational class the particular count is associated with.

After generating the count strings 120, 122, 124, 126, and 128, the count strings 120, 122, 124, 126, and 128 may be compared to reference count strings within a reference database 130 to generate scores 140. In this regard, the reference database 130 may be a collection of count strings associated with previously identified substreams that have become reference sub streams. The reference database 130 may also include information related to and tagged to the reference substreams that indicate, for example, attribution information related to the reference substream, the software titles where the reference substream has previously appeared (e.g., malware titles, game titles, office software titles, etc.), a software binary identifier (e.g., a unique indicator or name of the software binary) that the reference substream has been previously located within, known vulnerabilities of the reference substream, licensing information regarding the reference substream, and the like. As such, the comparison of a count string 120, 122, 124, 126, and 128 to the reference count strings may identify a match, which would reveal further information about the related substream and the related software binary that is made available via the reference database 130.

A match between a count string and a reference count string may not be limited to an exact match. Rather, a score 140 (e.g., a similarity score) may be generated in an effort to determine a match which may indicate a degree of similarity between the count string and a reference count string. As such, a score exceeding a predetermined threshold of similarity may be considered a match. Such scoring may be substream-level scoring to determine matching substreams or count strings.

Additionally or alternatively, scoring may be performed at the software binary level. In this regard, according to some example embodiments, a score may be based on the number of matching tuples between the count strings of a software binary (e.g., the count strings 120, 122, 124, 126, and 128 of the software binary 100) and reference count strings associated with a reference software binary. Since the organization or ordering of the substreams need not be considered in the comparing and scoring, software binaries that, for example, differ only in the order of the substreams may be scored as exact matches. According to some example embodiments, a ratio of matching count strings to non-matching count strings may be determined to be a score 140. Accordingly, scoring, based on some example embodiments, may be determined with respect to similarities to a specific count string or scoring may be determined based on the set of counts strings that are generated from a software binary. As such, scoring may be performed in a variety of ways based on the matching of the count strings to the reference count strings.

Based on the scoring, a classification of the software binary 100 may be determined. In this regard, the information linked to the reference count strings in the reference database 130 may be used to classify the software binary 100. In this regard, for example, if the scoring for the count strings 120, 122, 124, 126, and 128 exceeds a score threshold, then a match to a reference software binary may be identified, which indicates that the software binary 100 is classified as being, for example, known malware or likely to be malware. In another context, for example, if the scoring for the count strings 120, 122, 124, 126, and 128 exceeds a score threshold, then, for example, a match to a reference software binary may be identified, which indicates that the software binary 100 is classified as including code that is subject to licensing requirements or is an out-of-date version of software code. In this regard, use of certain code that is subject to licensing agreements can be identified and enforcement of a licensing agreements may be undertaken. Accordingly, based on the count string matches with the reference database 130, the software binary 100 may be classified to indicate further information about the software binary 100 and the software associated with the software binary 100.

Further, according to some example embodiments, all count strings of the software binary 100 need not be subjected to comparison with the reference library 130. In this regard, for efficiency, some count strings may be deemed to be of low significance and disregarded. To identify a low significance count string, according to some example embodiments, the diversity of the count string may be evaluated. In this regard, count strings that include tokens from more operational classes may be more diverse than a count strings that include tokens from fewer operational classes (or one operational class). As such, a significance criterion in the form of, for example, a threshold degree of diversity may be defined, e.g., a count string must have at least minimum number of tokens from a minimum number of operational classes to be of sufficient significance to warrant comparison with the reference library 130. Additionally, in this regard, for example, a section of code that had identifiable boundaries but contained only a single operational class (as, for example, a jump table might), may not have a count string that differentiates it from numerous other jump tables that are not at all related (except by the fact of being jump tables). As such, a count string that includes all tokens in the jump operational class or more than a threshold percentage of tokens in the jump operational class may be disregarded.

As mentioned above, the boundary rules for determining the substreams may be applied to the token string 101. However, according to some example embodiments, the boundary rules or similar boundary rules may be applied directly to the software binary 100 and the commands of the software binary 100. As such, boundaries may be defined based on the commands of the software binary 100, rather than the tokens of the token stream 101. In this regard, according to some example embodiments, the representation of the software binary that is acted upon by the substream boundary rules may be software binary itself. As such, boundary rules may be defined, for example, that determine a boundary position based on an exit command, read and write commands to non-volatile registers, a maximum length for substreams, or the like. In example embodiments where tokenization at the software binary level is not implemented, tokenization may occur upon determination of the substreams (in this regard, non-tokenized substreams and then tokenization of the substreams may be performed) to thereby support generation of respective count strings. According to some example embodiments, by performing tokenization after the substeams are defined, a context of the substream may be considered and a type of tokenization mapping (taken from a number of tokenization mapping options) may be selected based on the context. In this regard, according to some example embodiments, multiple tokenization mappings may be performed on the same substream to thereby generate respective count strings for each type of tokenization mapping to be compared to the reference database 130 as described herein. In this regard, according to some example embodiments, performing tokenization upon the substreams may also retain code that could be lost if full binary tokenization is performed. As such, a tradeoff may exist as to whether the additional processing time to separate the binary into substreams, review the context of the full binary code, and then apply specialized tokenization is sufficiently beneficial. According to some example embodiments, tokenization may be a lossy compression, and instances may arise in which particular algorithms are being examined, crypto algorithms, for example, in which it may be useful to retain additional information in tokenization for more detailed analysis. Further, according to some example embodiments, further compression of the software binary into macros prior tokenization may be advantageous to, for example, retain high value code.

Figure 2:
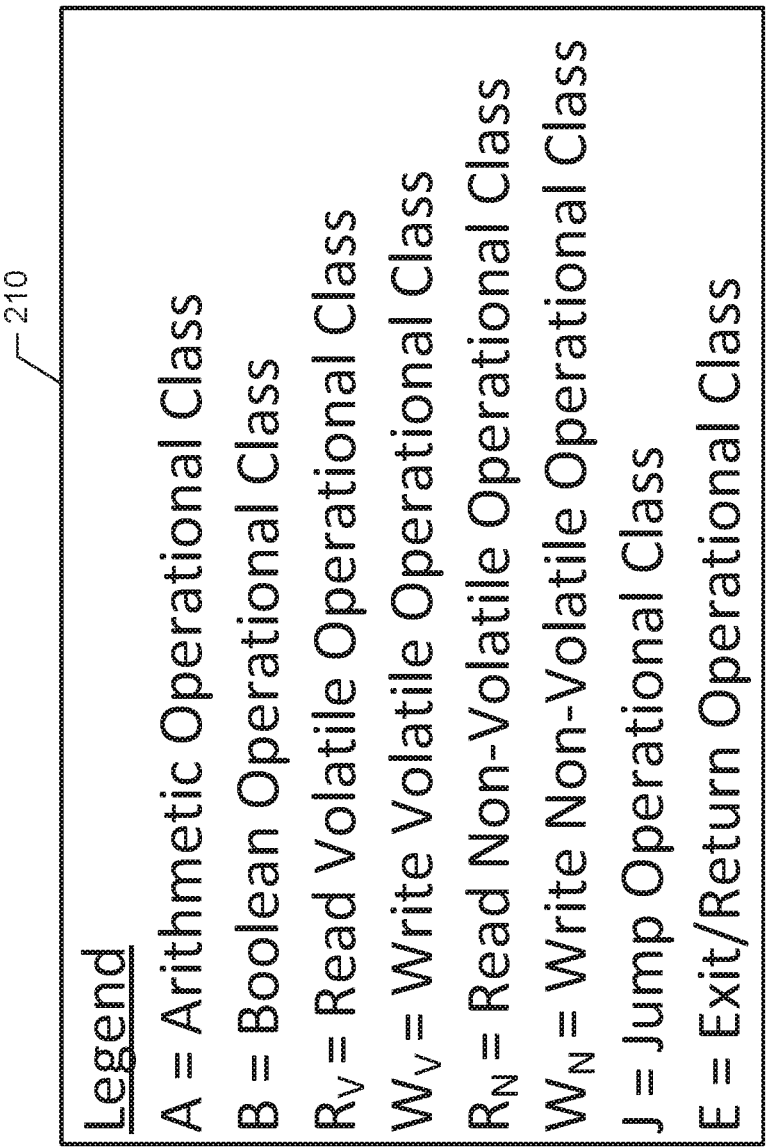
FIG. 2 illustrates an example model count string for a substream and an example operational class legend according to some example embodiments.
Figure 3:
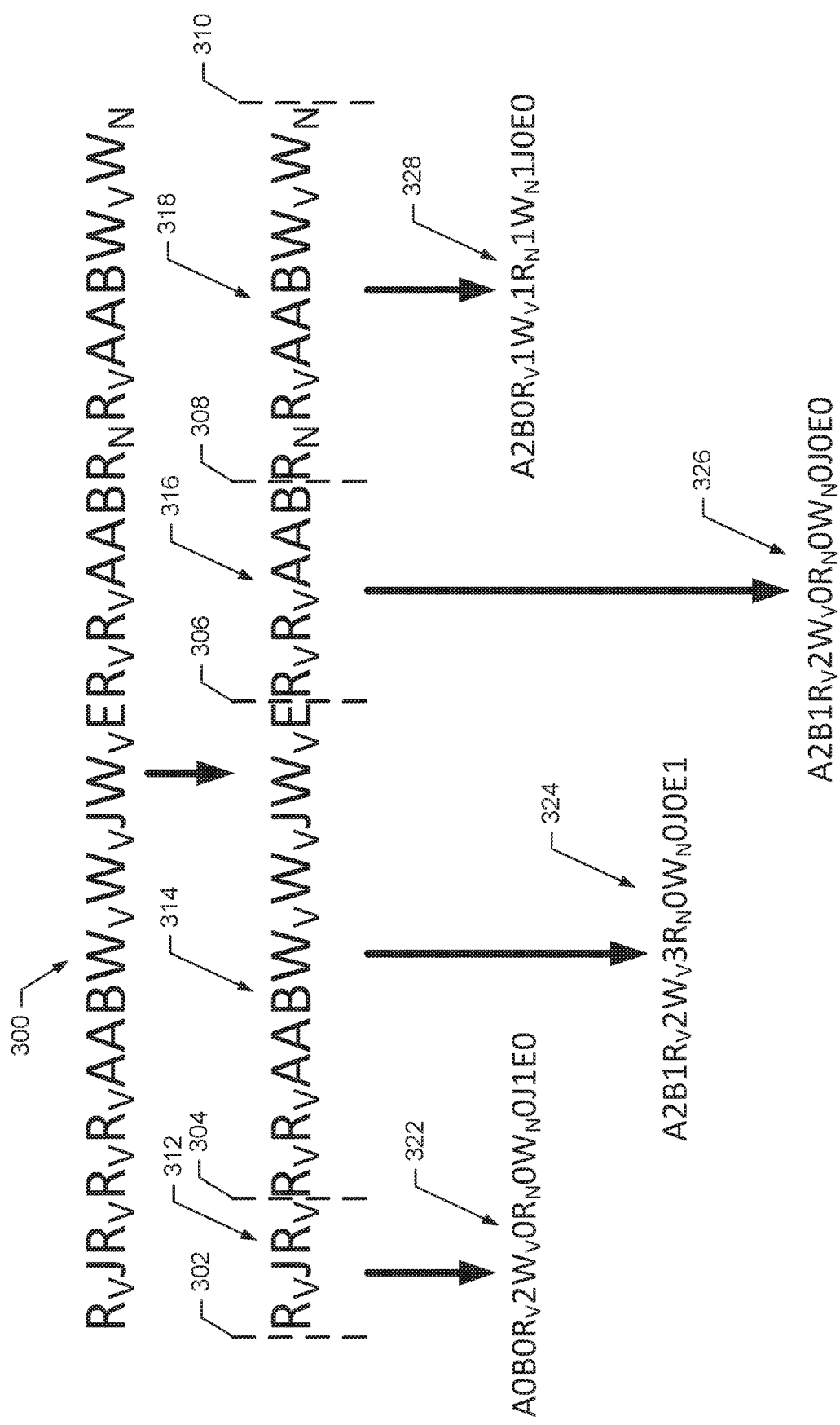
FIG. 3 illustrates an example token stream of a software binary and segmentation of the example token stream to form respective count strings according to some example embodiments.

Having described some example embodiments in more general terms, a more specific implementation of some example embodiments can be described with respect to FIGS. 2 and 3. It is understood that the specific implementation described with respect to FIGS. 2 and 3 is merely an example and that the scope is not limited by this example. In this regard, with reference to FIG. 2, a model count string 200 is defined based on the legend 210 of defined operational classes. The model count string 200 has a fixed length based on the universe of defined operational classes in the legend 210. The model count string 200 includes a position for a token count for each operational class defined in the legend 210.

As shown in FIG. 2, the legend 210 defines a number of operational classes in an implementation for an example x86 environment and associated software binaries. However, as mentioned above, it is understood that any number of additional operational classes may be defined according to some example embodiments and within different contextual environments. The legend 210 indicates the name of the operational class and the associated operational class identifier that is used in the model count string 200 (e.g., "A" is used to indicate the arithmetic operational class). As shown in the model count string 200, each operational class identifier from the legend 210 is followed by a lower case italicized variable that is a count placeholder for the token count for the operational class (e.g., "a" is the placeholder for the count of tokens (e.g., an integer) in the substream that are in the arithmetic class).

With reference to FIG. 3, an example token stream 300 of a software binary is provided. The token mapping performed to generate the token stream 300 is based on the operational classes in the legend 210. According to some example embodiments, the token stream 300 may be analyzed with respect to substream boundary rules to determine substream boundary locations in the token stream 300. According to some example embodiments, to determine the substream boundaries, the operation may begin at the end (right side) of the token stream 300. As such, an initial boundary 310 may be defined at the end of the token stream 300.

As the analysis proceeds, a write operation to a non-volatile register is identified ($W_N$) and a preceding a read operation to a non-volatile register ($R_N$) is identified. An example substream boundary rule may indicate that when a non-volatile register is read from and then subsequently written to, then a boundary is determined that precedes the read operation to a non-volatile register ($R_N$). Based on such a rule, the substream boundary 308 may be defined.

Proceeding towards the beginning of the token string 300 from the newly defined boundary 308, an exit token (E) is identified. An example substream boundary rule may indicate that when an exit token (E) is identified, then a boundary is determined that follows the exit token. Applying this example rule, a substream boundary 306 may be determined.

As each newly determined substream boundary is determined, a token counter may be reset. The token counter may be incremented as the method proceeds from a previous boundary. Another example substream boundary rule may indicate that when the token counter reaches a predetermined threshold number, then a substream boundary may be determined. In the example of FIG. 3, the predetermined threshold number may be set to ten (10) tokens. A rule may therefore be defined that if the analysis proceeds from a previous substream boundary by the maximum length, and no other rule determined a new boundary, then a substream boundary may be determined at the maximum length.

As such, when proceeding towards the beginning of the token string 300 from the newly defined boundary 306, no operations with respect to a non-volatile registers are encountered and no exit tokens are encountered before the token counter reaches ten tokens. As such, after the $10^{th}$ token, which in the token string 300 is the second read operation of the a volatile register after substream boundary 306 (i.e., the second $R_V$ after substream boundary 306 moving from right to left), a substream boundary 304 may be determined. Additionally, as the process continues, the beginning of the token stream 300 is reached and a boundary 302 is determined.

Having defined the substream boundaries 302, 304, 306, 308, and 310, the token stream 300 may be segmented into the respective substreams 312, 314, 316, and 318. Having defined the substreams, the process of generating the count strings may be performed. As indicated above, according to some example embodiments, to generate the count strings, each token for each operational class may be counted and the respective count values may be input into the model count string 200. In this regard, substream 312 contains three tokens—two volatile register reads and one jump. As such, the fixed length count string 322 has zeros in all operational class count placeholders except for the read volatile operational class and the jump operational class. Accordingly, the count string 322 for the substream 312 is A0B0R$_{V}$2W$_{V}$0R$_{N}$0W$_{N}$0J1E0. Using the same process, the count strings 324, 326, and 328 may be generated based on the substreams 314, 316, and 318, respectively. As described above, subsequent to generating the count strings, comparing, scoring, and classifying may be performed based on the reference database 130.

Figure 4:
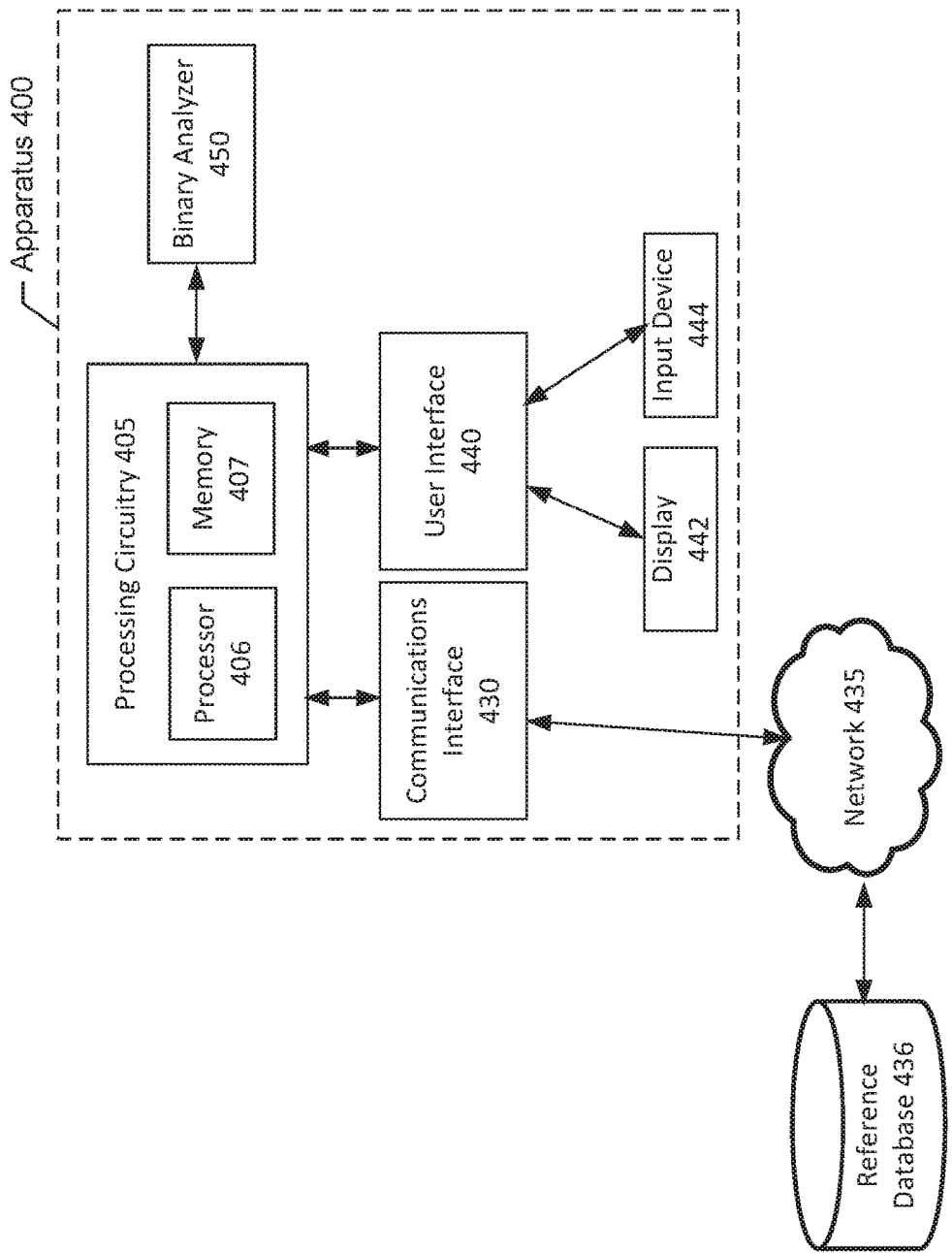
FIG. 4 illustrates an apparatus comprising processing circuitry configured to analyze software binaries according to some example embodiments.

FIG. 4 illustrates a block diagram of an example apparatus 400, within a system, that may be configured to classify software binaries based on substreams of a software binary. In this regard, an apparatus in the form of a computing device having improved computer functionality is shown that may, according to some example embodiments, be configured to perform the operations described with respect to FIGS. 1 to 3, as well as FIGS. 5 and 6 described below. According to some example embodiments, the apparatus 400 may comprise processing circuitry 405, a communications interface 430, a user interface 440, and a binary analyzer 450.

The processing circuitry 405 may be in operative communication with or embody some or all of the other components of the apparatus 400 (e.g., the communications interface 430, the user interface 440, the binary analyzer 450, or the like). Further, the processing circuitry 405 may interact with or embody a memory 407 and a processor 406. The processing circuitry 405 may be configurable to perform various operations as described herein. In this regard, the processing circuitry 405 may be configured to perform computational processing (e.g., code analysis) and memory management according to some example embodiments to facilitate performing various functionalities.

In some embodiments, the processing circuitry 405 may be embodied as a chip or chip set. In other words, the processing circuitry 405 may comprise one or more physical packages (e.g., chips) including materials, components or wires on a structural assembly (e.g., a baseboard). According to some example embodiments, the processing circuitry 405 may be a computing cluster that includes a number of processors (e.g., a number of processors 406) configured to operate in parallel to more rapidly complete tasks. The processing circuitry 405 may be configured to receive inputs such as from the communications interface 430 or the user interface 440, perform actions based on the inputs, and generate outputs to, for example, provide analysis feedback regarding a software binary to a user via a display 442. In an example embodiment, the processing circuitry 405 may include one or more instances of the processor 406, associated circuitry, and the memory 407. As such, the processing circuitry 405 may be embodied as a circuit chip (e.g., an integrated circuit chip, such as a field programmable gate array (FPGA)) configured (e.g., with hardware, software or a combination of hardware and software) to perform operations described herein.

In some example embodiments, the memory 407 may include one or more non-transitory memory devices such as, for example, volatile or non-volatile memory that may be either fixed or removable. The memory 407 may be configured to store information, data, applications, instructions or the like for enabling, for example, software binary analysis and the like to carry out various functions in accordance with example embodiments. For example, the memory 407 could be configured to buffer data being processed by the processing circuitry 405. Additionally or alternatively, the memory 407 could be configured to store instructions for execution by the processing circuitry 405. Among the contents of the memory 407, applications may be stored for execution by the processing circuitry 405 in order to carry out the functionality associated with each respective application. Further, according to some example embodiments, a reference library, as described herein, may be stored in the memory 407, rather than being disposed remote from the apparatus 400 as shown in FIG. 4.

As mentioned above, the processing circuitry 405 may be embodied in a number of different ways. For example, the processing circuitry 405 may be embodied as various processing means such as one or more processors that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 405 may be configured to execute instructions stored in the memory or otherwise accessible to the processing circuitry 405. As such, whether configured by hardware or by a combination of hardware and software, the processing circuitry 405 may represent an entity (e.g., physically embodied in circuitry—in the form of processing circuitry 405) capable of performing operations according to example embodiments while configured accordingly. Thus, for example, when the processing circuitry 405 is embodied as an ASIC, FPGA, or the like, the processing circuitry 405 may be specifically configured hardware for conducting the operations described herein. Alternatively, as another example, when the processing circuitry 405 is embodied as an executor of software instructions, the instructions may specifically configure the processing circuitry 405 to perform the operations described herein.

The communications interface 430 may include one or more interface mechanisms for enabling communications between other external devices and the apparatus 400, and more specifically, the processing circuitry 405 of the apparatus 400. For example, the communications interface 430 may be configured to interface with, for example, a network 435 to facilitate forming a communications link with other entities, such as the reference database 436, which may be the same or similar to the reference database 130. In some example embodiments, the communication interface 430 may be any means such as a device or circuitry embodied in either hardware, or a combination of hardware and software that is configured to receive or transmit data from/to devices in communication with the processing circuitry 405. According to some example embodiments, the communications interface 430 may include a radio and an antenna to facilitate wireless communications. The communications interface 430 may support one or more communications protocols. In this regard, the communications interface 430 and the antenna may support communications via, for example, Bluetooth or WIFI connections.

The user interface 440 may be controlled by the processing circuitry 405 to interact with a user. In this regard, via the user interface 440, the processing circuitry 405 may be configured to output to a user, via an output device, such as, for example, driving a display 442 and receive input from a user via an input device such as, for example, input device 444, which may be, for example, a touch screen, buttons, a camera, a microphone, a keyboard, a mouse, or the like. The user interface 440 may also produce outputs, for example, via the display 442, a speaker, haptic feedback systems, or the like.

The binary analyzer 450 may be embodied by the processing circuitry 405 and may operate to configure the processing circuitry 405 to perform the various operations described herein regarding software binary analysis. The binary analyzer 450 may be embodied as hardware in example embodiments where the processing circuitry 405 includes or is embodied by an ASIC, FPGA, or the like and thereby configure the processing circuitry 405 accordingly. Further, the binary analyzer 450 may alternatively be embodied as stored software instructions or code (e.g., possibly stored on the memory 407) for execution by the processor 406 to configure the processing circuitry 405 accordingly. As such, the binary analyzer 450 may operate to configure the processing circuitry 405 to determine a software classification by determining and analyzing substreams of software binaries. In this regard, the binary analyzer 450 may configure the processing circuitry 405 to receive a software binary, for example, via the communications interface 430 and determine a plurality of substream boundaries including a first substream boundary within a representation of the software binary, which may be a tokenized version of the software binary or the software binary itself. The binary analyzer 450 may also configure the processing circuitry 405 to segment the representation of the software binary, based on the plurality of substream boundaries, into a plurality of substreams including a first substream and a second substream. In this regard, the first substream boundary may separate the first substream from the second substream. Further, the binary analyzer 450 may configure the processing circuitry 405 to generate a first count string for the first substream based on operational class token counts of a tokenization of the first substream. In this regard, the tokenization of the first substream may be based on a mapping of commands within the first substream to operational classes. Further, the binary analyzer 450 may also configure the processing circuitry 405 to the perform a first count string comparison with reference database 436 to determine a first count string match, wherein the first count string comparison may be based on the first count string. The binary analyzer 450 may also configure the processing circuitry 405 to classify the software binary based on the first count string match. Additionally, as further, described below, the binary analyzer 450 may also configure the processing circuitry 405 to perform the operations, and variations thereof, of the example method described with respect to the example method of FIG. 6.

Figure 5:
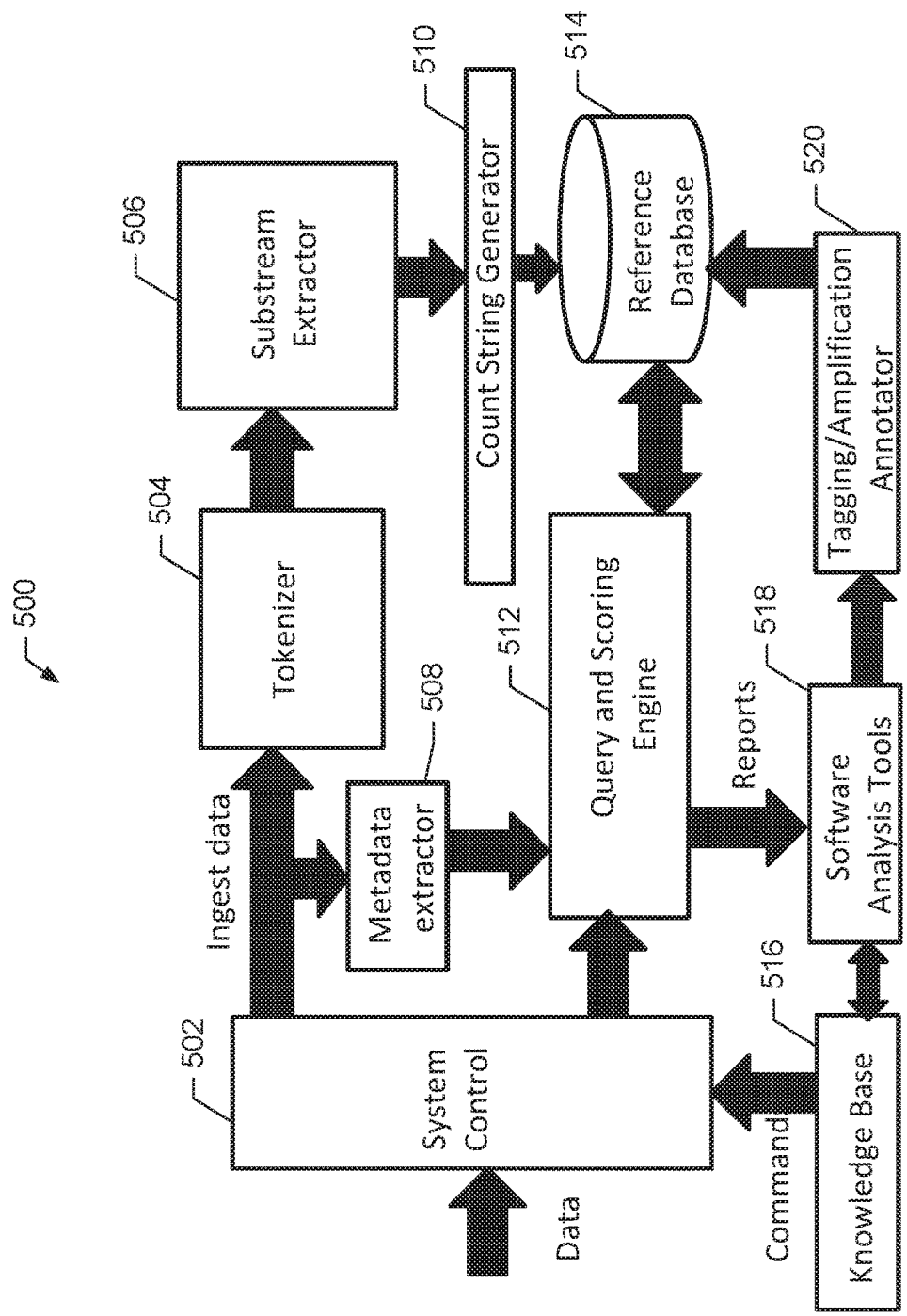
FIG. 5 illustrates an example flowchart block diagram of an example software binary analysis system and process according to some example embodiments.

FIG. 5 illustrates an example flowchart block diagram of an example software binary analysis system and process according to some example embodiments. The blocks of the flowchart may be representative of operations and associated circuitry (e.g., processing circuitry 405) or other components configured to perform the operations. In this regard, the system 500 may receive data in the form of software binaries at the system control 502. According to some example embodiments, system control 502 may be disposed on a perimeter of a secure environment and may include, for example, a fire wall. The data received by the system control 502 may be passed to a tokenizer 504, a metadata extractor 508, and a query and scoring engine 512.

The tokenizer 504 may ingest the data in the form of a software binary and operate to tokenize the software binary as described above. After tokenization, the substreams may be segmented based on the determined substream boundaries and extracted by the substream extractor 506. Subsequently, the count strings may be formed by the count string generator 510.

The metadata extractor 508 may capture information in the form of metadata that may be related to the received software binary. In this regard, for example, the metadata extractor 508 may capture information such as the time and date that the software binary was received or other temporal information associated with the software binary. Additionally, the metadata extractor 508 may capture, for example, the internet protocol (IP) address that the software binary was received from. This type of metadata may be stored and leveraged during the analysis of the software binary to determine additional relationships between the received software binary and previously analyzed software binaries that may be stored in the reference database 514 for comparison. Such metadata may also be used for tagging as further indicated below. According to some example embodiments, the reference database 514 and the reference database 130 may be the same or similar as described herein.

The query and scoring engine 512 may operate to compare the determined count strings to the count strings stored in the reference database 514 to determine count string matches and associated scores for the substreams and the software binary as described herein. The results generated by the query and scoring engine 512 may be provided in the form of, for example, reports for further analysis by the software analysis tools 518. The software analysis tools 518 may be, for example, automated reverse engineering tools that further refine the analysis of the software binary. The tagging/amplification annotator 520 may have rules governing what information may be inherited by newly discovered count strings and stored in the reference database 514. Further, the tagging/amplification annotator 520 may operate to couple related information (e.g., metadata) to the software binary and the count strings that have been formed based on the software binary for storage in the reference database 514 and future use in new software binary analyses. Further, the tagging/amplification annotator 520 may be configured to store information that provides an audit trail for count strings to facilitate later determinations regarding how automated conclusions arose several generations later. The application of rules may be accompanied by a reference to the rule that permitted inheritance and/or propagation of information to new count string, and thus supports backtracking of decision authorities in analysis. Further, the tagging/amplification annotator 520 may also operate to tag certain count strings with a significance value for consideration during an analysis. In this manner, the reference database 514 may increase the reference information to address future queries involving newly received software binaries. Additionally, the reports and refinements generated by the software analysis tools 518 may be applied to a knowledge base 516, which may operate to provide commands to the system control 502. The knowledge base 516 may also include data, and may be designed to support machine learning, so that users managing large volumes of data have the opportunity to be told of changes and anomalies without having to know to ask for this information. In this regard, the commands provided by the knowledge base 516 may control the operation of the system control 502 to act upon the received data and, for example, block certain data from entering the system that has been identified as malware, or add alerts to select out data for specialized handling.

Figure 6:
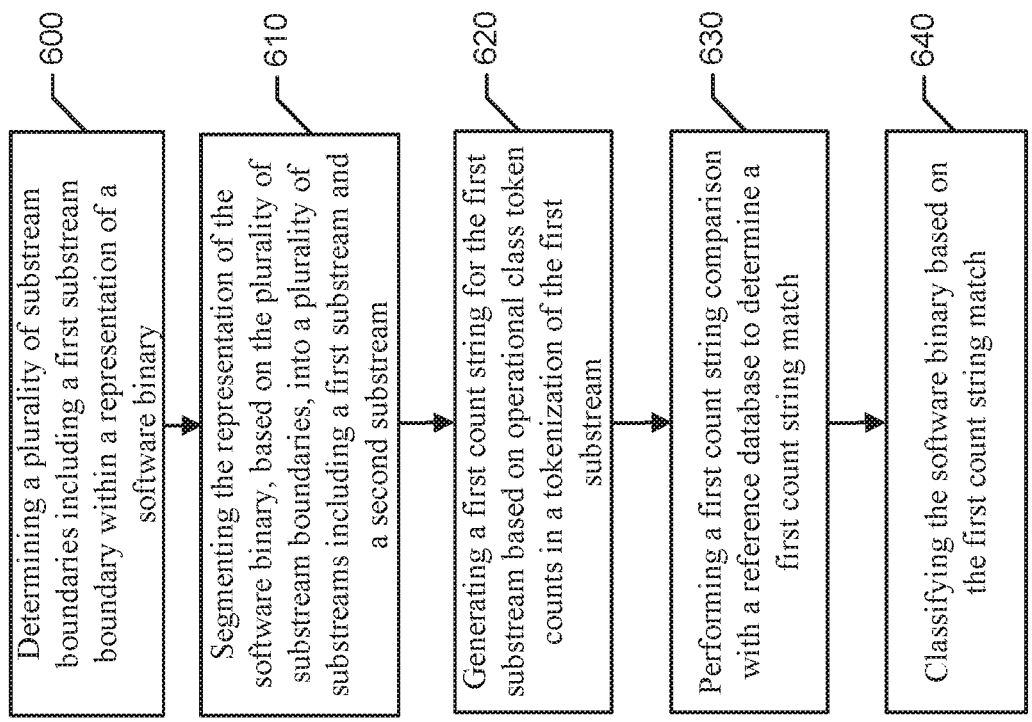
FIG. 6 illustrates a block diagram of a method for analyzing software binaries according to various example embodiments.

With reference back to FIG. 4 and as mentioned above, the processing circuitry 405 of the apparatus 400 may be configured to perform, or cause the performance of, the operations described herein including the operations of the example method described with respect to FIG. 6. In this regard, the example method of FIG. 6 may operate to determine a software classification based on substreams of associated software binaries according to some example embodiments. According to some example embodiments, the operations of the example method of FIG. 6 may be performed by specifically configured processing circuitry, such as processing circuitry 405, to realize an improvement in computer functionality, as described herein.

In this regard, at 600, the example method may include determining a plurality of substream boundaries including a first substream boundary within a representation of a software binary, which may be a tokenized software binary or the software binary itself. The substream boundaries may be determined in a number of ways. For example, according to some example embodiments, substream boundaries may be determined at locations within the representation of the software binary where exit tokens or commands are found. Further, according to some example embodiments, substream boundaries may be determined at locations within the representation of the software binary where actions taken with respect to non-volatile registers occur. Further, according to some example embodiments, a substream boundary may be determined at locations that are a threshold number of tokens or commands away from a previously determined substream boundary, after having determined no other basis to define a new substream boundary.

Additionally, the example method may include, at 610, segmenting the representation of the software binary, based on the plurality of substream boundaries, into a plurality of sub streams. In this regard, at least a first substream and a second substream may be defined where the first substream boundary separates the first substream from the second substream.

Further, at 620, the example method may include generating a first count string for the first substream to form a first count string associated with the first substream. According to some example embodiments, the first count string may be formed by mapping commands within the first substream based on operational class token counts in a tokenization of the first substream. In this regard, according to some example embodiments, the tokenization of the first substream may be based on a mapping of commands within the first substream to operational classes. Additionally, according to some example embodiments, the first count string may comprise a operational class identifier and an operational class token count for each operational class. Further, according to some example embodiments, the operational classes may comprise an arithmetic class, a Boolean class, a read register class, a write register class, and a code jump class. According to some example embodiments, the example method may include generating a set of count strings, where each count string within the set of count strings has a common length. According to some example embodiments, the example method may include generating, for example, a third count string for a third substream within the plurality of sub streams, the tokenization of the third substream being based on a mapping of commands within the third substream to the operational classes.

Additionally, at 630, the example method may include performing a first count string comparison with a reference database to determine a first count string match. The first count string comparison may be performed based on the first count string. As such, performing the first count string comparison may comprise determining a score for the first count string relative to a reference count string of the reference database in accordance with some example embodiments. Any number of comparisons may be performed based on count strings associated with substreams of the software binary. In this regard, the example method may include performing, for example, a second count string comparison or third count string comparison with the reference database to determine a second count string match or a third count string match. Similarly, the second or third count string comparison may be based on the second count string or the third count string.

Additionally, according to some example embodiments, the example method may include determining that the first count string satisfies a significance criterion, and performing the first count string comparison may comprise performing the first count string comparison in response to the first count string satisfying the significance criterion. In other words, if the significance criterion is not met, then, according to some example embodiments, the first count string may be disregarded and no count string comparison may be performed on the first count string. According to some example embodiments, the significance criterion may be based on, for example, a diversity of operational classes having tokens in the first count string.

According to some example embodiments, the example method may also include, at 640, classifying the software binary based on the first count string match. By determining a count string match based on the reference library, information about the substream and the software binary may be determined, with respect to, for example, the identification of malware, unlicensed use of software, or the like. In this regard, according to some example embodiments, classifying the software binary may comprise determining a software title or a source or attribution information for the software binary. Further, the classification of the software may be based on count string matches for more than one of the count strings that are generated from the sub streams of the software binary. In this regard, according to some example embodiments, classifying the software binary may comprise classifying the software binary based on, for example, the first count string match, the second count string match, or the third count string match.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for determining a software classification, the method comprising:

determining, via processing circuitry, a plurality of substream boundaries including a first substream boundary within a representation of a software binary;

segmenting, via the processing circuitry, the representation of the software binary, based on the plurality of substream boundaries, into a plurality of substreams including a first substream and a second substream, wherein the first substream boundary separates the first substream from the second substream;

generating, via the processing circuitry, a plurality of count strings comprising a first count string, each count string of the plurality of counts strings being formed in accordance with a format of a model count string as a tokenization of a respective substream of the plurality of substreams, the first count string being a tokenization of the first substream based on a mapping of commands within the first substream to operational classes, the first count string comprising operational class token counts indicating a number of commands in each operational class within the first substream formatted in accordance with the model count string;

performing, via the processing circuitry, a first count string comparison with reference count strings in a reference database to determine a first count string match, the first count string comparison being based on a comparison of the operational class token counts indicating the number of commands in each operational class within the first substream with operational class token counts indicating numbers of commands in each operational class within the reference count strings of the reference database; and classifying, via the processing circuitry, the software binary based on the first count string match.

2. The method of claim 1, wherein determining the plurality of substream boundaries comprises determining locations of exit commands within the representation of the software binary.

3. The method of claim 1, wherein determining the plurality of substream boundaries comprises determining locations of commands acting upon non-volatile registers.

4. The method claim 1, wherein determining the plurality of substream boundaries includes determining locations within the representation of the software binary that are a threshold number of commands from a previously determined boundary.

5. The method of claim 1, wherein generating the first count string comprises determining respective counts of tokens for each operational class within the tokenization of the first substream.

6. The method of claim 1, wherein the operational classes comprise an arithmetic class, a Boolean class, a read register class, a write register class, and a code jump class.

7. The method of claim 1, further comprising:
generating a third count string for a third substream within the plurality of substreams;
performing a third count string comparison with the reference count strings in the reference database to determine a third count string match, the third count string comparison being based on a comparison of operational class token counts indicating a number of commands in each operational class within the third count string with the operational class token counts indicating the numbers of commands in each operational class within the reference count strings of the reference database; and wherein classifying the software binary comprises classifying the software binary based on the first count string match and the third count string match.

8. The method of claim 1, further comprising determining that the first count string satisfies a significance criterion; and
wherein performing the first count string comparison comprises performing the first count string comparison in response to the first count string satisfying the significance criterion.

9. The method of claim 8, wherein the significance criterion is based on a diversity of operational classes having tokens in the first count string.

10. The method of claim 1, wherein each count string of the plurality of count strings has a common length based on the model count string.

11. The method of claim 1, wherein performing the first count string comparison comprises determining a score for the first count string relative to a reference count string of the reference database.

12. The method of claim 1, wherein classifying the software binary comprises determining a software title associated with the software binary.

13. An apparatus configured to determine a software classification, the apparatus comprising processing circuitry configured to:
receive a software binary;
determine a plurality of substream boundaries including a first substream boundary within a representation of the software binary;
segment the representation of the software binary, based on the plurality of substream boundaries, into a plurality of substreams including a first substream and a second substream, wherein the first substream boundary separates the first substream from the second substream;
generate a plurality of count strings comprising a first count string, each count string of the plurality of counts strings being formed in accordance with a format of a model count string as a tokenization of a respective substream of the plurality of substreams, the first count string being a tokenization of the first substream based on a mapping of commands within the first substream to operational classes, the first count string comprising operational class token counts indicating a number of commands in each operational class within the first substream formatted in accordance with the model count string;
perform a first count string comparison with reference count strings in a reference database to determine a first count string match, the first count string comparison being based on a comparison first the operational class token counts indicating the number of commands in each operational class within the first substream with operational class token counts indicating numbers of commands in each operational class within the reference count strings of the reference database; and
classify the software binary based on the first count string match.

14. The apparatus of claim 13, wherein the processing circuitry configured to determine the plurality of substream boundaries includes being configured to:
determine locations of exit commands within the representation of the software binary;
determine locations of commands acting upon non-volatile registers; and determine locations within the representation of the software binary that are a threshold number of commands from a previously determined boundary.

15. The apparatus of claim 13, wherein the processing circuitry is further configured to determine that the first count string satisfies a significance criterion; and
wherein the processing circuitry configured to perform the first count string comparison includes being configured to perform the first count string comparison in response to the first count string satisfying the significance criterion, wherein the significance criterion is based on a diversity of operational classes having tokens in the first count string.

16. The apparatus of claim 13, wherein each count string of the plurality of count strings has a common length based on the model count string.

17. The apparatus of claim 13, wherein the processing circuitry configured to perform the first count string comparison includes being configured to determine a score for the first count string relative to a reference count string of the reference database.

18. The apparatus of claim 13, wherein the processing circuitry configured to classify the software binary includes being configured to determine a software title associated with the software binary.

19. A method for determining a software classification, the method comprising:
determining, via processing circuitry, a plurality of substream boundaries including a first sub stream boundary within a representation of a software binary;
segmenting, via the processing circuitry, the representation of the software binary, based on the plurality of substream boundaries, into a plurality of substreams including a first substream and a second substream, wherein the first substream boundary separates the first substream from the second substream;
generating, via the processing circuitry, a plurality of count strings comprising a first count string, each count string of the plurality of counts strings being formed in accordance with a format of a model count string as a tokenization of a respective substream of the plurality of substreams, the first count string being a tokenization of the first substream based on a mapping of commands within the first substream to operational classes, the first count string comprising operational class token counts indicating a number of commands in each operational class within the first substream formatted in accordance with the model count string, the operational classes comprising a read register class, a write register class, and a code jump class;
performing, via the processing circuitry, a first count string comparison with reference count strings in a reference database to determine a first count string match, the first count string comparison being based on a comparison of the operational class token counts indicating the number of commands in each operational class within the first substream with operational class token counts indicating numbers of commands in each operational class within the reference count strings of the reference database; and
classifying, via the processing circuitry, the software binary based on the first count string match.

* * * * *